United States Patent [19]

Nguyen

[11] Patent Number: 6,146,497

[45] Date of Patent: *Nov. 14, 2000

[54] ADHESIVES AND RESINS, AND PROCESSES FOR THEIR PRODUCTION

[75] Inventor: Tuyen T. Nguyen, Wilmington, Del.

[73] Assignee: Hercules Incorporated, Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 09/008,079

[22] Filed: Jan. 16, 1998

[51] Int. Cl.⁷ .............................. D21F 11/00; D21H 23/00

[52] U.S. Cl. ...................... 162/158; 162/164.1; 162/165; 162/166; 162/183; 525/328.5; 525/329.4; 525/330.6; 524/557; 524/547; 524/555; 524/560; 524/565

[58] Field of Search .............................. 525/328.8, 328.5, 525/61, 329.4, 330.6, 329.1; 524/557, 547, 555, 560, 565; 528/211, 228, 229; 162/158, 168, 165, 164.1, 183

[56] References Cited

U.S. PATENT DOCUMENTS

| | | | |
|---|---|---|---|
| 2,872,313 | 2/1959 | House et al. .............................. 92/1.4 |
| 2,926,154 | 2/1960 | Keim ...................................... 260/29.2 |
| 3,427,217 | 2/1969 | Miller .......................................... 162/6 |
| 3,617,428 | 11/1971 | Carison .................................. 161/133 |
| 3,809,605 | 5/1974 | Schmitt et al. ......................... 162/158 |
| 3,886,234 | 5/1975 | Ishihara et al. ..................... 260/878 R |
| 4,083,749 | 4/1978 | Miwa et al. ......................... 162/168 N |
| 4,196,271 | 4/1980 | Yamada et al. ......................... 525/242 |
| 4,217,425 | 8/1980 | Ballweber et al. ..................... 525/155 |
| 4,421,602 | 12/1983 | Brunnmueller et al. ............. 162/168.2 |
| 4,454,005 | 6/1984 | Stofko et al. ............................. 162/12 |
| 4,501,640 | 2/1985 | Soerens ................................... 162/111 |
| 4,510,019 | 4/1985 | Bartelloni ............................... 162/141 |
| 4,528,316 | 7/1985 | Soerens ................................... 524/503 |
| 4,647,952 | 3/1987 | Pokora et al. .......................... 346/210 |
| 4,684,439 | 8/1987 | Soerens ................................... 162/111 |
| 4,788,243 | 11/1988 | Soerens ................................... 524/503 |
| 4,880,497 | 11/1989 | Pfohl et al. ............................. 162/135 |
| 4,900,671 | 2/1990 | Pokora et al. .......................... 435/156 |
| 4,921,621 | 5/1990 | Costello et al. ..................... 252/8.513 |
| 4,952,656 | 8/1990 | Lai et al. .............................. 525/328.2 |
| 4,954,538 | 9/1990 | Dauplaise et al. ...................... 523/223 |
| 4,966,652 | 10/1990 | Wasser ................................... 162/135 |
| 4,981,557 | 1/1991 | Bjorkquist ............................ 162/168.2 |
| 5,037,927 | 8/1991 | Itagaki et al. ......................... 526/307.7 |
| 5,041,503 | 8/1991 | Dauplaise et al. ..................... 525/383 |
| 5,110,740 | 5/1992 | Pokora et al. .......................... 435/262 |
| 5,126,395 | 6/1992 | End et al. ............................... 524/801 |
| 5,143,828 | 9/1992 | Akkara ...................................... 435/41 |
| 5,147,791 | 9/1992 | Morrow et al. ......................... 435/123 |
| 5,153,298 | 10/1992 | Pokora et al. ............................ 528/86 |
| 5,187,219 | 2/1993 | Furman, Jr. ............................. 524/377 |
| 5,246,544 | 9/1993 | Hollenberg et al. .................... 162/111 |
| 5,281,307 | 1/1994 | Smigo et al. ......................... 162/164.3 |
| 5,300,566 | 4/1994 | Pinschmidt, Jr. et al. ................ 525/60 |
| 5,320,711 | 6/1994 | Dauplaise et al. ................... 162/168.2 |
| 5,330,619 | 7/1994 | Johnson et al. ............................ 162/5 |
| 5,338,807 | 8/1994 | Espy et al. .............................. 525/430 |
| 5,340,731 | 8/1994 | Kilburn et al. ......................... 435/179 |
| 5,374,334 | 12/1994 | Sommese et al. ...................... 162/111 |
| 5,388,807 | 2/1995 | Habicht ................................... 251/306 |
| 5,401,810 | 3/1995 | Jansma et al. .......................... 525/385 |
| 5,427,652 | 6/1995 | Darlington et al. ................. 162/164.3 |
| 5,490,904 | 2/1996 | Jansma et al. ....................... 162/168.2 |
| 5,567,798 | 10/1996 | Dulany et al. .......................... 528/332 |
| 5,582,682 | 12/1996 | Ferretti ..................................... 162/10 |
| 5,723,022 | 3/1998 | Dauplaise et al. ................... 162/168.3 |
| 5,846,788 | 12/1998 | Pedersen et al. ....................... 435/101 |

FOREIGN PATENT DOCUMENTS

| | | |
|---|---|---|
| 979579 | 12/1975 | Canada . |
| 1279145 | 6/1986 | Canada . |
| 1291303 | 2/1988 | Canada . |
| 1337616 | 7/1989 | Canada . |
| 0585955 | 3/1994 | European Pat. Off. . |
| 0 678 528 A1 | 4/1994 | European Pat. Off. . |
| 0606889 | 7/1994 | European Pat. Off. . |
| 606889 | 7/1994 | European Pat. Off. . |
| 739709 | 10/1996 | European Pat. Off. . |
| 1266503 | 4/1968 | Germany . |
| 9603546 | 2/1990 | WIPO . |
| 9305226 | 3/1993 | WIPO . |
| 9321331 | 10/1993 | WIPO . |
| 9420682 | 9/1994 | WIPO . |
| 9707203 | 2/1997 | WIPO . |
| 9707282 | 2/1997 | WIPO . |

OTHER PUBLICATIONS

Akkara et al., "Synthesis and Charaxterization of Polyphenols from Peroxidase–Catalyzed Reactions," *Enzyme Microb. Technol.* vol. 13, p. 521 (Jun. 1991).

Bruno et al., "Enzyme Catalyzed 2–D Polymerization of Phenol Derivatives on a Langmuir–Blodgett Trough," *Polymer Reprints*, vol. 32, No. 1, pp. 232–233 (1991).

Casey, *Pulp and Paper*, vol. 1, pp. 159–162. Publication Date is not Disclosed.

Schmalz, *TAPPI* 44, No. 4, pp. 275–280 (Apr. 1961).

Sperling and Mishra, in "Polymers for Advanced Technologies, vol. 7" ppl. 197–208, 1996.

TAPPI Method T 205PM–88 (1988).

Casey, *Pulp and Paper*, vol. I, p. 341. Publication Date is not Disclosed.

Dordick et al., "Polymerization of Phenols Catalyzed by Peroxidase in Nonaqueous Media," *Biotechnology and Bioengineering*, vol. 30, pp. 31–36 (1987).

Espy, "The Mechanism of Wet–Strength Development in Paper: A Review," *Tappi Journal*, vol. 78, No. 4, pp. 90–97 (Apr. 1995).

Westfelt, "Chemistry of Paper Wet–Strength. I. A Survey of Mechanism of Wet–Strength Development," *Cellulose Chemistry and Technology*, vol. 13, pp. 813–825 (1979).

*Primary Examiner*—James J. Seidleck
*Assistant Examiner*—U. K. Rajguru
*Attorney, Agent, or Firm*—Greenblum & Bernstein, P.L.C.

[57] ABSTRACT

Additives for addition to starting materials in cellulose based products for imparting strength and crepe. Additives for use in paper production which impart strength to the product and which can be used in creping adhesives. Enzyme activated resins for use in paper production. Enzyme-activated adhesives for use in paper production. Paper products comprising the aforementioned additives or resins. Methods for imparting strength or crepe to paper products.

68 Claims, No Drawings

ADHESIVES AND RESINS, AND PROCESSES FOR THEIR PRODUCTION

BACKGROUND OF THE INVENTION

1. Field of the Invention

This invention relates to adhesives and resins, and processes for their preparation. More particularly, this invention relates to resin and adhesive compositions which can be particularly used in the manufacture of cellulose-based products, and more particularly paper products. Resins and adhesives of the present invention are produced by combining a water-soluble polymeric material which comprises a nucleophile, a phenolic material, and a component that serves to activate the phenolic material to make it reactive with the nucleophile of the polymer. Adhesives and resins produced according to the present invention are particularly useful in the paper making industry but their application is not limited thereto.

2. Background of the Invention and Related Information

Many compositions for resins and adhesives are known in the art. Most of these compositions, however, include components which can be considered environmentally "unfriendly," or even toxic. In addition, some existing adhesives and resins are, in themselves, environmentally "unfriendly" or toxic. There is, therefore, a need for resins and adhesives which are non-toxic and which are produced from non-toxic components.

The paper-making industry has long been concerned with ways of increasing the strength of wetted paper. Paper constructed without additional means of reinforcement will often fall apart upon rewetting. Paper which maintains its strength upon wetting is desirable in many applications, including bathroom tissue, paper towels, napkins, and the like. In addition, additives which increase the strength of wet paper often increase the dry strength of the same paper.

Many of the additives known in the art which can be used to increase the wet strength of paper take advantage of the chemical structure of the cellulose found therein. The cellulose found in paper products often has carboxylate and hydroxyl moieties exposed along its chain. Through the use of reactive additives, crosslinks can be formed between these moieties in the chains of cellulose in the paper, thereby increasing the strength of the paper. Alternatively, some additives do not react with the cellulose, but increase the paper strength by some other, unknown mechanism. In either case, the additives are usually chosen for their ability to adhere to the pulp, and for their ability to form a structural network which can repress cellulose fiber swelling, thereby inhibiting separation of the fiber-fiber contacts upon wetting.

Some of the earliest wet-strength resins were condensation products of urea and formaldehyde, with polyamine added to make the resin cationic. Such resins appear only to impart wet-strength via self-crosslinking. However, resins formed from melamine and formaldehyde appear to crosslink the cellulose directly. Polyamide and epichlorohydrin form resins which react with the cellulose carboxylate groups. At higher concentrations, polyamide/epichlorohydrin resins appear to form self-crosslinks as well. Other resins include those formed by epoxides, which react analogously and also with the cellulose hydroxyl groups, and those formed from aldehydes, which appear to crosslink cellulose reversibly, through hemiacetal bonds, and self-crosslink at amide groups. A discussion of wet-strength resins and their mechanisms is presented in "The Mechanism of Wet-Strength Development in Paper: A Review," by Herbert H. ESPY, *Tappi Journal*, Vol. 78, No. 4, pages 90–97 (April 1995) as well as in "Chemistry of Paper Wet-Strength. I. A Survey of Mechanisms of Wet-Strength Development," by Lars WESTFELT, *Cellulose Chemistry and Technology*, Vol. 13, pages 813–825 (1979). The entire contents of both ESPY and WESTFELT are hereby incorporated by reference as though set forth in full herein.

According to ESPY, a wet-strength resin should exhibit four key attributes. These resins should first be water soluble, allowing for an even dispersion and effective distribution over the cellulose fibers. Next, the resins should have some cationic character, inherent or otherwise, facilitating their adsorption onto anionic fibers in the pulp. The resins should also be polymeric, with higher molecular weight polymers apparently forming stronger bonds. Finally, the resins should be reactive, a quality which allows them to be crosslinked to both themselves and to the cellulose in the paper.

Resins comparable to those used for increasing paper strength also find application in creping adhesives. In the manufacture of specific paper products, such as facial tissue, bathroom tissue, or paper towels, the paper web is subjected to a creping process in order to give the paper product desirable characteristics, such as softness and bulk. Typically, the creping process involves adhering the web, a cellulose web in the case of paper, to a rotating creping cylinder, such as that used in a Yankee dryer. The adhered web is then detached with a doctor blade. The impact of the web against the blade disrupts fiber-to-fiber bonds within the web, causing the web to wrinkle, or pucker.

The extent of creping action is dependent on several factors, including the degree of adhesion between the web and the surface of the creping cylinder. Greater adhesion between the web and cylinder results in increased softness, albeit generally with some loss of strength. In order to increase adhesion, a creping adhesive is often used. In addition, creping adhesives can also reduce the wear on a dryer surface, provide lubrication between a doctor blade and a dryer surface, reduce chemical corrosion, and control the extent of creping. Ideally, a creping adhesive adheres the sheet just tightly enough to the drum to produce a good crepe, imparting absorbency and softness to the final product, with a minimal loss of paper strength. However, if adhesion of the web to the dryer drum is too strong, the sheet may pick or even "plug," i.e., underride the doctor blade, and wrap around the dryer drum. On the other hand, if adhesion is too weak, the sheet will lift off too easily and undergo too little creping.

Examples of creping agents are disclosed in U.S. Pat. No. 5,187,219, to FURMAN, U.S. Pat. No. 5,246,544, to HOLLENBERG et al., U.S. Pat. No. 5,338,807, to ESPY et al., and U.S. Pat. No. 5,374,334, to SOMNESE et al. Other examples of creping agents are disclosed in U.S. Pat. Nos. 4,684,439, 4,788,243, 4,501,640, and 4,528,316, each to SOERENS. FURMAN, HOLLENBERG et al., ESPY et al., SOMNESE et al., and SOERENS U.S. Pat. Nos. '439, '243, '640, and '316, are hereby incorporated by reference as though set forth in full herein.

The present invention advances the field of resin compositions for use in paper making. Many of the resin compositions known in the art are toxic to animals, or can be harmful to the environment. The present invention provides an "environmentally friendly" alternative to the known additives and resins. Embodiments of the present invention are essentially chemically benign, using a biocatalytic process to induce crosslinking in a paper product.

The use of a biocatalytic process to induce polymerization of phenols is known in the art. DORDICK et al. describes the production of polymers produced by horseradish peroxidase-catalyzed coupling of phenols in "Polymerization of Phenols Catalyzed by Peroxidase in Nonaqueous Media," *Biotechnology and Bioengineering* Vol. 30, pgs. 31–36 (1987). POKORA et al. describes the use of such catalytic processes in the production of developer resins in U.S. Pat. No. 4,647,952 ('952), and expanded on those processes in U.S. Pat. No. 4,900,671 ('671), and 5,153,298 ('298). POKORA also describes the use of polyphenol resins in the production of paper in U.S. Pat. No. 5,110,740 ('740). DORDICK et al. and POKORA et al. U.S. Pat. Nos. '952, '671, '298, and '740, are hereby incorporated by reference as though set forth in full herein.

The use of enzymes to catalyze the polymerization of phenols in monolayers is described by AKKARA et al. in U.S. Pat. No. 5,143,828, and in "Synthesis and Characterization of Polyphenols from Peroxidase-Catalyzed Reactions," *Enzyme Microb. Technol.* vol. 13, page 521 (June 1991), as well as in BRUNO et al., "Enzyme Catalyzed 2-D Polymerization of Phenol Derivatives on a Langmuir-Blodgett Trough," *Polymer Reprints,* Vol. 32, No. 1, pgs. 232–233 (1991). The enzyme-catalyzed formation of polyesters is described in U.S. Pat. No. 5,147,791, to MORROW et al. AKKARA et al., BRUNO et al., and MORROW et al., are hereby incorporated by reference as though set forth in full herein.

The present invention provides novel and "environmentally friendly" methods and resin and adhesive compositions. Such compositions are particularly useful in the paper making process.

SUMMARY OF THE INVENTION

The present invention is directed to processes for producing adhesives and resins, and to products made thereby.

The present invention is directed to processes for producing oxidation-activated adhesives and resins, and to products made thereby.

The present invention is directed to producing enzyme-activated adhesives and resins, and to the products made thereby.

The present invention is directed to methods for producing adhesive compositions and resin compositions for use in making paper, and the products made thereby.

The present invention is directed to methods of providing materials which can be added at the wet end of paper production, increasing the strength of a paper product.

The present invention is directed to producing articles which employ activated adhesives and resins, including oxidation-activated adhesives and resins.

The present invention is directed to methods of providing materials which are chemically benign for addition at the wet end of paper production to increase the strength of a paper product.

The present invention is directed to producing resins and adhesives, formed from chemically benign materials, which can be used in paper making processes.

The present invention is directed to producing a paper product which is strengthened by a resin formed by the addition of chemically benign materials at the wet end of production.

The present invention is directed to producing an adhesive for use in paper creping.

The present invention is directed to producing a paper product which has been formed through the use of such creping adhesive.

These and other aspects of the present invention are achieved by the provision of a composition comprising (a) water-soluble polymeric material comprising at least one nucleophilic polymer, (b) phenolic compound, and (c) an oxidizing component.

In another manner of describing the present invention, there is provided a composition comprising (a) water-soluble polymeric material comprising at least one nucleophilic polymer, (b) phenolic compound, and (c) a component capable of converting the phenolic compound into a quinone compound.

Component (c) may be a single component, or a mixture of components, and preferably comprises the above-noted oxidizing component. For example, the oxidizing component may comprise a member selected from the group consisting of potassium dichromate, potassium permanganate, and mixtures thereof or the oxidizing component may comprise a mixture of components such as hydrogen peroxide and a material such as a metal catalyst, which can cause hydrogen peroxide to release oxygen. Metal catalysts include, but are not limited to, ferric chloride, cobalt chloride, cupric chloride, and mixtures thereof.

Additionally, the oxidizing component may comprise an enzyme system. The enzyme system may comprise at least one oxidation enzyme. For example, the oxidation enzyme may comprise an oxidase, which preferably comprises a member selected from the group consisting of laccase, tyrosinase, polyphenol oxidase, and mixtures thereof. Alternatively, the oxidation enzyme may comprise a peroxidase, which preferably comprises a member selected from the group consisting of horseradish peroxidases, soybean peroxidases, haloperoxidases, lactoperoxidases, bacterial peroxidases, and mixtures thereof. More preferably, the peroxidase comprises horseradish peroxidase.

When utilizing the enzyme system, the reaction can occur in the presence of atmospheric air. However, the enzyme system preferably further comprises at least one oxygen source. The oxygen source may comprise a member selected from the group consisting of perborates, persulfates, peroxides, and mixtures thereof. In alternative embodiments, the enzyme system may comprise an alcohol oxidase and its corresponding alcohol, such as ethanol and ethanol oxidase. Alternatively, the enzyme system may comprise a sugar oxidase and its corresponding sugar, such as glucose and glucose oxidase or galactose and galactose oxidase.

The oxidizing component may comprise an enzyme system in combination with another oxidizing component, such as an enzyme system in combination with potassium permanganate.

In preferred embodiments, the nucleophilic polymer comprises the following general structure:

FORMULA I

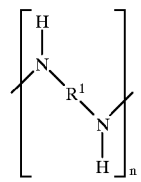

wherein n is an integer greater than 2, and $R^1$ comprises a hydrocarbyl group. Preferably the hydrocarbyl group comprises from about 2 to about 20 carbons. Preferably the hydrocarbyl group comprises from about 6 to about 10 carbons, and more preferably comprises about 6 carbons. Preferably the hydrocarbyl group comprises an alkyl group having from about 2 to about 20 carbons. Preferably the alkyl group comprises from about 6 to about 10 carbons, and more preferably comprises about 6 carbons. In Formula I, preferably, n is from about 10 to about 200. More preferably, n is from about 50 to about 100, and n is most preferably from about 50 to about 80. The nucleophilic polymer may comprise a polyalkyl amine or a polycyclic alkyl amine.

In alternative preferred embodiments, the nucleophilic polymer comprises the following general structure:

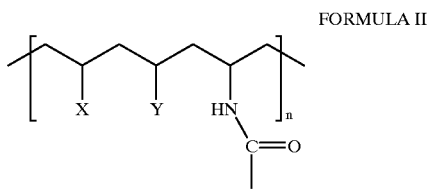

FORMULA II wherein n is an integer greater than 2, X comprises a nucleophile, and Y comprises a water solubility enabling group. In Formula II, the nucleophile preferably comprises a member selected from the group consisting of —$NH_2$, —$NHR^2$, —SH, —$SOO^-$, —$ArO^-$, and —$PR^2_2$, wherein $R^2$ comprises a hydrocarbyl group comprising from about 1 to about 12 carbons, and Ar comprises a benzenoid, a substituted benzenoid, or a napthalenoid group. Preferably the hydrocarbyl group comprises a benzenoid group or an alkyl group comprising from about 1 to about 12 carbons. In Formula II, the water solubility enabling group preferably comprises a cationic, an anionic, an amphoteric, or a hydrogen bond participating group. In Formula II, the water solubility enabling group preferably comprises a member selected from the group consisting of —$N^+(R^3)_3$, —$COO^-$, —$OSO_3^-$, —$OPO_3^-$, —$N^+(R^3)_2$—$R^{3'}$—$COO^-$, —OH, —$CONH_2$, and —$B(OH)_2$, wherein $R^3$ and $R^{3'}$ each comprise a hydrocarbyl group having from about 1 to about 12 carbons, such as any straight chain or cyclic moiety.

The nucleophilic polymer may comprise a member selected from the group consisting of polyvinyl alcohols, polyvinyl sulfones, polyacrylamides, polyacrylates, polyacrylonitriles, polyethers, polyesters, polyarylethers, polyarylsulfones, polyamides, polyimides, polyalkanes, polyaminoalkanes, polyphenyls, and mixtures thereof.

The nucleophilic polymer may be formed by various processes, including a process comprising at least one addition reaction followed by reduction. Preferably, the nucleophilic polymer is formed by a reaction comprising a member selected from the group consisting of nucleophilic displacement, amination, nitration, sulfonation, phosphorylation, and combinations thereof. The nucleophilic polymer may comprise a member selected from the group consisting of —$NH_2$, —$NHR^4$, —SH, —$SOO^-$, —$PR^4_2$, —$ArO^-$, and mixtures thereof, wherein $R^4$ comprises a hydrocarbyl group comprising between about 1 and about 12 carbons, and Ar comprises a benzenoid or a napthalenoid group. Preferably the hydrocarbyl group comprises a benzenoid group or an alkyl group comprising from about 1 and about 12 carbons. The nucleophilic polymer may be formed by polymerizing a monomer comprising a nucleophile. In preferred embodiments, the nucleophilic polymer comprises polyvinyl amine alcohol, which preferably comprises from about 0.01% to about 100% amine. More preferably, the polyvinyl amine alcohol comprises from about 10% to about 50% amine, and most preferably, the polyvinyl amine alcohol comprises about 12% amine.

The phenolic compound may comprise phenols or polyphenols. In preferred embodiments, the phenolic material comprises the following general chemical structure:

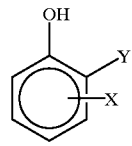

FORMULA III wherein Y comprises —H or —OH and X comprises —$OR^5$, —$R^5$, —Ar, or —$NR^5R^{5'}$, wherein $R^5$ and $R^{5'}$ comprise H or a hydrocarbyl group comprising from about 1 to about 12 carbons, and Ar comprises a benzenoid or napthalenoid group. Preferably the hydrocarbyl group comprises an alkyl group comprising from about 1 to about 12 carbons. The phenolic compound may comprise a member selected from the group consisting of polyphenols, substituted polyphenols, phenols, substituted phenols, catechols, substituted catechols, hydroquinones, substituted hydroquinones, aminophenols, substituted aminophenols, and mixtures thereof. Preferably, the phenolic compound comprises 1,2-benzenediol. In alternative preferred embodiments, the phenolic compound comprises 1,4-benzenediol.

The phenolic compound may comprise a polyphenolic compound, which preferably comprises a member selected from the group consisting of phloroglucinol, lignins, catechins, flavonoids, and mixtures thereof. Preferably, such a polyphenolic compound is a naturally-occurring compound. Alternatively, the polyphenolic compound may comprise a member selected from the group consisting of polyphenols, resols, novolaks, calixerenes, and mixtures thereof. Preferably, such a polyphenolic compound is a synthetic compound.

In preferred embodiments, the compositions of the present invention may be combined with a cellulosic material, which may comprise paper pulp.

These and other aspects of the present invention are further achieved by the provision of a resin for imparting strength to a paper product, produced by combining (a) water-soluble polymeric material comprising at least one nucleophilic polymer, (b) phenolic compound, and (c) an oxidizing component. Alternatively, component (c) may comprise a component capable of converting the phenolic compound into a quinone compound. In preferred embodiments, the oxidizing component may comprise an enzyme system. This resin may be used in combination with cellulosic material, such as fiber mat, woven cloth, box, board, sheet, wood, particle board, wood stranded board, or laminate. These and other aspects of the present invention are further achieved by the provision of a paper product comprising such a resin.

These and other aspects of the present invention are further achieved by the provision of a creping adhesive, produced by combining (a) water-soluble polymeric material comprising at least one nucleophilic polymer, (b) phenolic compound, and (c) an oxidizing component. In another manner of describing the invention, component (c) may comprise a component capable of converting the phenolic compound into a quinone compound. In preferred embodiments, the oxidizing component comprises an enzyme system. The creping adhesive may be used in combination with cellulosic material, such as fiber mat, woven cloth, box, board, sheet, wood, particle board, wood stranded board, or laminate. These and other aspects of the present invention are further achieved by the provision of a paper product comprising such creping adhesive.

These and other aspects of the present invention are further achieved by the provision of a method of increasing the strength of a paper product, comprising adding (a) water-soluble polymeric material comprising at least one nucleophilic polymer, (b) phenolic compound, and (c) an oxidizing component, to paper pulp. In another manner of describing the invention, component (c) may comprise a component capable of converting the phenolic compound into a quinone compound. In preferred embodiments, the oxidizing component comprises an enzyme system.

These and other aspects of the present invention are further achieved by the provision of a method of imparting strength to a cellulose-based product comprising combining (a) water-soluble polymeric material comprising at least one nucleophilic polymer, (b) phenolic compound, and (c) an oxidizing component, to cellulosic starting materials. In another manner of describing the invention, component (c) may comprise a component capable of converting the phenolic compound into a quinone compound. In preferred embodiments, the oxidizing component comprises an enzyme system.

These and other aspects of the invention are further achieved by the provision of a kit comprising a water-soluble polymeric material comprising at least one nucleophilic polymer, a phenolic compound, and a component capable of converting the phenolic compound into a quinone compound. In another manner of describing the invention, the component capable of converting the phenolic compound into a quinone compound comprises an oxidizing component. In some embodiments, the kit comprises an oxygen source. In other embodiments, the kit does not include any oxygen source.

DEFINITIONS

Certain terms and phrases are used repeatedly throughout the specification and claims of this patent. The following definitions of these terms are provided for consistency and clarity.

basis weight—the total weight of a sheet of paper of 3000 sf.
Canadian Standard of Freeness—a measure of the rate of drainage or the pulp. Described in *Pulp and Paper, Volume* 1, James P. Casey, Interscience Publishers, Inc., New York, 1952, page 341, the entire contents of which volume is hereby incorporated by reference as though set forth in full herein.
kraft—sulfate pulping method as described in *Pulp and Paper, Volume* 1, James P. Casey, Interscience Publishers, Inc., New York, 1952, page 159.

DETAILED DESCRIPTION OF PREFERRED EMBODIMENTS OF THE INVENTION

The present invention is directed to adhesives and resins usable in a variety of applications.

In preferred embodiments, the present invention is directed to cross linking systems for use as additives in the paper making process. In one preferred embodiment, the present invention is directed to methods for improving the creping process in paper production. In other preferred embodiments, the present invention is further directed to methods for improving the wet and dry strength of a paper product.

The present invention is not limited to uses in making paper. The present invention is also applicable in the production of numerous cellulose-based products, including fiber mat, woven cloth, box, board, sheet, wood, particle board, wood stranded board, laminate, etc. Products such as these are especially applicable to the present invention because they are produced from cellulosic starting materials. In accordance with the present invention, strength can be imparted to these products by the by the addition of (a) water-soluble polymeric material comprising at least one nucleophilic polymer, (b) phenolic compound, and (c) an oxidizing component, to the cellulosic starting materials. In another manner of describing the invention, component (c) may comprise a component capable of converting the phenolic compound into a quinone compound.

Preferably, when used as an additive for improving paper strength, the cross linking system of the present invention is added to the pulp at the wet end of the process. The ingredients can also be added at the dry end as a premix, or as separate ingredient streams. Preferably, when used as a creping adhesive, the additives may be introduced at the wet end of the process as well. Alternatively, it is also preferable to introduce a resin, produced according to the present invention, directly onto the creping cylinder prior to adhering the web to the drum. As a creping adhesive, the material is preferably prepared as a premix, in which all ingredients are mixed and allowed to develop into an adhesive constituent prior to application to the creping cylinder.

Adhesives and resins of the present invention comprise: (a) water-soluble polymeric material comprising at least one nucleophilic polymer, (b) phenolic compound, and (c) an oxidizing component. In another manner of describing the invention, component (c) may comprise a component capable of converting the phenolic compound into a quinone compound.

When referring to components throughout this application, unless otherwise noted, reference to a component in the singular also includes combinations of the components. For example, as used herein, the term water-soluble polymeric material comprising at least one nucleophilic polymer is meant to include water-soluble polymers comprising nucleophiles, alone and/or in combination. As used herein, the term phenolic compound is meant to include phenolic compounds, alone and/or in combination. Further, as used herein, an oxidizing component is meant to include oxidizing components, alone and/or in combination.

As used herein, the term "hydrocarbyl" is understood to include "aliphatic," "cycloaliphatic," and "aromatic." The hydrocarbyl groups are understood to include alkyl, alkenyl, alkynyl, cycloalkyl, aryl, aralkyl, and alkaryl groups. Further, "hydrocarbyl" is understood to include both non-substituted hydrocarbyl groups, and substituted hydrocarbyl groups, with the latter referring to the hydrocarbon portion bearing additional substituents, besides carbon and hydrogen.

In greater detail, the water-soluble polymer comprising a nucleophile may be selected from any water-soluble polymer which comprises a nucleophile. As used herein, the term water-soluble polymer refers to polymers which can be made into a hot or cold aqueous solution at a concentration of at least about 0.01%. Preferably, such polymer comprises polyalkyl amine, polycyclic alkyl amine, polyvinyl alcohol, polyvinyl sulfone, polyacrylamide, polyacrylate, polyacrylonitrile, polyether, polyester, polyarylether, polyarylsulfone, polyamide, polyimide, polyalkane, polyaminoalkane, and/or polyphenyl. Most preferably, the polymer comprises polyvinyl amine alcohol. Preferably, the polyvinyl amine alcohol comprises from about 0.01% to about 100% amine; more preferably comprises from about 10% to about 50% amine; and most preferably comprises about 12% amine.

The nucleophile may be any known nucleophile, and preferably comprises —$NH_2$, —$NHR^4$, —SH, —$SOO^-$, —$PR^4_2$, and —$ArO^-$, or mixtures thereof, wherein $R^4$ comprises a hydrocarbyl group in which the number of carbons ranges from about 1 to about 12, and Ar comprises a benzenoid or napthalenoid group. Preferably the hydrocarbyl group comprises a benzenoid group or an alkyl group comprising from about 1 to about 12 carbons. The nucleophile may be attached to the polymer backbone in any manner known in the art. Preferably, the nucleophile is attached by a process comprising an addition reaction, followed by reduction. Preferably, the nucleophile is attached via nucleophilic displacement, amination, nitration, sulfonation, phosphorylation, or combinations thereof, each followed by reduction. In other preferable embodiments, the nucleophile is part of the monomer which polymerizes to form the polymer.

The following formula is a schematic structural representation of the general chemical formula of the water-soluble polymer of one embodiment of the invention, wherein the nucleophile is part of the polymer backbone:

FORMULA I

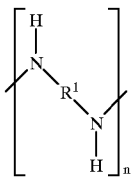

In Formula I, the brackets are meant to illustrate that the depicted portion is repeated n number of times. In Formula I, n may be any integer greater than 2, and is preferably between 10 and 200. More preferably, in Formula I, n is between 50 and 100, and n is most preferably between 50 and 80. In Formula I, $R^1$ may be any hydrocarbyl group. Preferably, the hydrocarbyl group comprises from about 2 to about 20 carbons. More preferably, the hydrocarbyl group comprises from about 6 to about 10 carbons, and most preferably comprises about 6 carbons. Preferably the hydrocarbyl group comprises an alkyl group having from about 2 to about 20 carbons. More preferably, the alkyl group has from about 6 to about 10 carbons. Most preferably, in Formula I, the alkyl group comprises 6 carbons. Examples of polymers which exhibit this general structure include, but are not limited to, polyalkyl amine, and polycyclic alkyl amine.

The following formula is a schematic chemical representation of the general chemical formula of a water-soluble polymer of one embodiment of the invention, wherein the nucleophile is attached to the polymer backbone:

FORMULA II

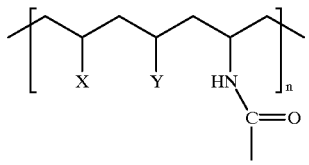

In Formula II, the brackets are meant to illustrate that the depicted portion is repeated n number of times. In Formula II, n may be any integer greater than 2, and is preferably greater than 100. In Formula II, X comprises any nucleophile, and preferably comprises —$NH_2$, —$NHR^2$, —SH, —$SOO^-$, —$PR^2_2$, and $ArO^-$, wherein $R^2$ comprises a hydrocarbyl group having from about 1 to about 12 carbons, and Ar comprises a benzenoid or substituted benzenoid, or a napthalenoid group. Preferably the hydrocarbyl group comprises a benzenoid group or an alkyl group having from about 1 to about 12 carbons. In Formula II, Y comprises any water solubility enabling group, and is preferably a cationic, an anionic, an amphoteric, or a hydrogen bond participating group, such as —$N^+(R^3)_3$ (where $R^3$ is any moiety having from about 1 to about 12 carbons, such as a C1–C12 straight chain or C1–C12 cyclic moiety), —$COO^-$, —$OSO_3^-$, —$OPO_3^-$, —$N^+(R^3)_2$—$R^{3'}$—$COO^-$ (where $R^3$ and $R^{3'}$ are any moiety having from about 1 to about 12 carbons, such as any C1–C12 straight chain or C1–C12 cyclic moiety), —OH, —$CONH_2$, and —$B(OH)_2$.

Examples of polymers in which the nucleophile is attached to the polymer backbone include, but are not limited to, polyvinyl alcohols, polyvinyl sulfones, polyacrylamides, polyacrylates, polyacrylonitriles, polyethers, polyesters, polyarylethers, polyarylsulfones, polyamides, polyimides, polyalkanes, polyaminoalkanes, polyphenyls, and mixtures thereof.

The phenolic compound for use in the invention may comprise polyphenols, substituted polyphenols, phenols, substituted phenols, catechols, substituted catechols, hydroquinones, substituted hydroquinones, aminophenols, substituted aminophenols, and/or mixtures thereof. The following formula schematically depicts the general chemical structure of a preferred phenolic compound according to the invention:

FORMULA III

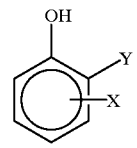

In Formula III, X preferably comprises —$OR^3$, —$R^3$, —$NR^3R^{3'}$, or —Ar, wherein $R^3$ and $R^{3'}$ comprise H or a hydrocarbyl group comprising from about 1 to about 12 carbons, and Ar comprises a benzenoid or napthalenoid group. Preferably the hydrocarbyl group comprises an alkyl group having from about 1 to about 12 carbons. In Formula III, Y preferably comprises —OH or —H. Examples of phenolic compounds which exhibit this general structure include, but are not limited to, phenol, catechol, hydroquinone, and aminophenol. Most preferably, the phenolic material comprises 1,2-benzenediol and/or 1,4-benzenediol. In other preferred embodiments, the phenolic compound may comprise a polyphenolic compound which may be of natural or synthetic origin. Preferable natural polyphenolic compounds include, but are not limited to, phloroglucinol, lignin, catechins, flavonoids, and mixtures thereof. Preferable synthetic polyphenolic compounds include, but are not limited to, polyphenol, resol, novolak, calixerenes, and mixtures thereof.

The present invention includes a component capable of converting the phenolic compound into a quinone compound. In another manner of describing the invention, this component may be an oxidizing component. The oxidizing component may comprise potassium dichromate, potassium permanganate, or mixtures thereof. The oxidizing component may comprise mixtures such as hydrogen peroxide and a material such as a metal catalyst which is capable of causing hydrogen peroxide to release oxygen. Metal catalysts include, but are not limited to, ferric chloride, cobalt chloride, cupric chloride, and mixtures thereof.

The oxidizing component preferably comprises an enzyme system. The enzyme system preferably comprises at least one oxidative enzyme component. In preferable embodiments, the enzyme component may comprise an enzyme such as an oxidase or peroxidase. Preferable oxidases and peroxidases include, but are not limited to, laccases, tyrosinases, polyphenol oxidases, horseradish peroxidases, soybean peroxidases, haloperoxidases, lactoperoxidases, bacterial peroxidase, and combinations thereof. Other preferable embodiments comprise combinations of different oxidases, combinations of different peroxidases, or combinations of oxidases and peroxidases. Most preferably, the enzyme component comprises horseradish peroxidase.

When utilizing the enzyme system, the reaction can occur in the presence of atmospheric air. However, the enzyme system preferably further comprises at least one oxygen source. The oxygen source may be direct, in which the oxygen is present as elemental oxygen, and/or indirect, in which the oxygen is released from a more complex molecule. Preferably the oxygen source comprises a source such as perborates, persulfates, peroxides, and mixtures thereof.

Other preferable enzyme systems comprise a mixture of a sugar oxidase and the corresponding sugar, such as galactose oxidase and galactose or glucose oxidase and glucose. Other preferable enzyme systems comprise an alcohol oxidase and the corresponding alcohol, such as ethanol oxidase and ethanol. Preferably, the enzyme system comprises horseradish peroxidase and the reaction occurs in the presence of atmospheric air.

Without being bound by theory, it is believed that, in the presence of an oxidizing component, a phenolic compound is made reactive by conversion into a quinone compound. In the presence of a substrate and a polymeric compound which comprises a nucleophilic moiety, the activated phenolic compound reacts with the polymer and the substrate to form a crosslink. The following reaction, Reaction I, is a schematic chemical representation of the aforementioned reaction as it might occur:

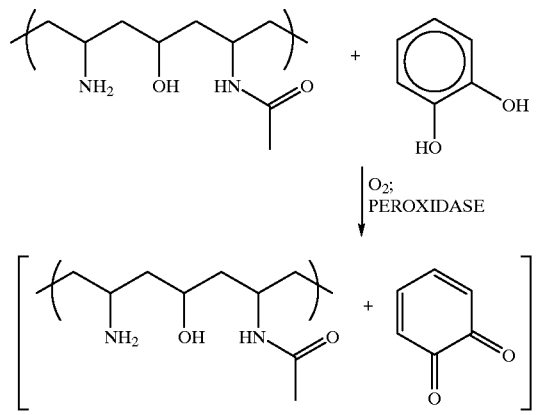

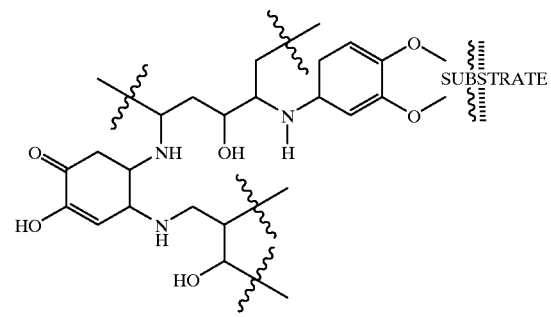

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosures of all patents and publications, cited above and below, are hereby incorporated by reference as though set forth in full herein.

EXAMPLES

Examples 1–6

Enzyme Activated Polymer System Imparts Strength to Paper

Handsheets are made on a Noble and Wood Sheet Machine (Noble and Wood Machine Co., Hoosick Falls, N.Y.) using standard hard water at a controlled pH. Standard hard water (50 ppm alkalinity and 100 ppm hardness) is made by mixing deionized water with $CaCl_2$ and $NaHCO_3$. Control of pH is achieved by using NaOH or $H_2SO_4$. The pulp is beaten to the desired freeness at a consistency of 2.5 weight %. The beaten pulp is added to a proportioner at a controlled level (depending on final desired basis weight). For 80 lb/3000 ft$^2$ basis weight, 4000 ml of beaten pulp is used. For 40 lb/3000 ft$^2$ basis weight, 2000 ml of beaten pulp is used. The beaten pulp is diluted to 18 liters with standard hard water. Chemical additions and pH adjustments are made to the proportioner as desired, with continuous mixing.

A clean and wetted 100 mesh screen is placed on an open deckle box, which is then closed. Standard hard water and 920 ml of pulp mixture from the proportioner are then added to the deckle box, and couched. Ingredients in accordance with the present invention are added to the deckle box, and mixed. The water is then drained from the box, and the sheet removed. The sheet is wet pressed between felts with press weights adjusted to give a solids content of 33–34%. The sheet and screen are then placed on a drum dryer, which is adjusted to a temperature of approximately 228–232° F. and throughput time of 50–100 seconds, depending on basis weight. Final sheet moisture content is 3–5%. A single sheet is made from 920 ml of the pulp mixture. Five sheets minimum are tested for each experimental set.

Tensile testing is done on the handsheets according to TAPPI Method T 494 om-88 ("TAPPI Test Methods," TAPPI Press, Atlanta, Ga., 1996).

For EXAMPLES 1–6, the following materials are added in accordance with the invention: polyvinyl amine alcohol, molecular weight of approximately 100 Kd, 6% amine (Air Product); catechol, 99% pure (Aldrich Chemical); hydroquinone (Eastman Kodak Chemical); peroxidase (Sigma Chemical); hydrogen peroxide, 3% solution (Baker Chemical). The specific amounts which are added to each batch (920 ml pulp mixture) are disclosed in Table 1. Additives are added as solutions in 10 ml water. For EXAMPLES 1–6, paper is manufactured at 80 lbs basis weight: 920 ml pulp mixture yielded 5.1 g pulp (weight of paper). Unless otherwise specified, the ratios shown in the Table are weight/weight. The following abbreviations are used in Table 1: polyvinyl amine alcohol, PVAA; catechol, CAT; hydroquinone, HQ; peroxidase, PER; and hydrogen peroxide, $H_2O_2$. Blank indicates no additional chemicals are added.

TABLE 1

EFFECT ON PAPER STRENGTH

| EXAMPLE | DESCRIPTION | WET TENSILE (lbs/in) | DRY TENSILE (lbs/in) |
|---|---|---|---|
| 1 | BLANK | 1.6 | 44.7 |
| 2 | 51 mg PVAA (MW 100K, 6% amine) | 8.8 | 59.3 |
| 3 | 51 mg PVAA/5.1 mg CAT (10/1) | 8.8 | 49.9 |
| 4 | 51 mg PVAA/5.1 mg CAT/ 0.25 mg PER (10/1/0.05) | 9.9 | 58.1 |
| 5 | 51 mg PVAA/5.1 mg CAT/ 0.25 mg PER/1.25 mg $H_2O_2$ (10/1/0.05/0.25) | 9.8 | 56.6 |
| 6 | 51 mg PVAA/5.1 mg HQ/ 0.25 mg PER (10/1/0.05) | 12.6 | 74.5 |

Examples 1–6 are presented as evidence that embodiments of the present invention impart strength to a paper product. The results presented in Table 1 clearly demonstrate the substantial increases in paper strength imparted by the present invention.

Examples 7–12
Effect of the Molecular Weight of the Polymer on Paper Strength

The paper is made according to the procedures set forth in EXAMPLES 1–6 above, with the exception that different amounts and kinds of materials were added, according to the invention. The specific amounts which are added to each batch (920 ml pulp mixture per piece of paper) are disclosed in Table 2. Additives are added as solutions in 10 ml water. Paper is manufactured at 80 lbs basis weight: 920 ml pulp mixture yielded 5.1 g pulp (weight of paper). The following new abbreviations are introduced for use in Table 2: polyvinyl amine alcohol (MW approximately 100 Kd, 6% amine), PVAA1; polyvinyl amine alcohol (MW approximately 30 Kd, 12% amine), PVAA2.

TABLE 2

EFFECT OF THE MOLECULAR WEIGHT OF THE POLYMER

| EXAMPLE | DESCRIPTION | WET TENSILE (lbs/in) | DRY TENSILE (lbs/in) |
|---|---|---|---|
| 7 | BLANK | 1.8 | 48.3 |
| 8 | 51 mg PVAA1 | 13.2 | 63.9 |
| 9 | 51 mg PVAA2 | 9.8 | 59.7 |
| 10 | 51 mg PVAA1/ 5.1 mg CAT/ 1.25 mg PER (10/1/0.25) | 16.7 | 78.2 |
| 11 | 51 mg PVAA2/ 5.1 mg CAT/ 1.25 PER (10/1/0.25) | 10.8 | 63.5 |
| 12 | 51 mg PVAA2/ 5.1 mg HQ/ 1.25 mg PER (10/1/0.25) | 14.8 | 68.2 |

TABLE 2-continued

Because the molecular weight of the polymer used in the present invention can have an effect on the strength imparted to the paper product, EXAMPLES 7–12 are provided to demonstrate this effect. Two different molecular weights of polymer were tested, 100 Kd and 30 Kd. From the results presented in Table 2, it is clear that the 100 Kd polymer performs better than the 30 Kd polymer.

Examples 13–18
Effect of the pH of the Paper Making Conditions

The paper is made according to the procedure set forth in EXAMPLES 1–6 above, with the exception that different amounts and kinds of materials were added, according to the invention, and the basis weight for the paper is 40 lbs. The weight per piece of paper is 2.5 g. The amounts and kinds of materials specifically used are disclosed in Table 3.

TABLE 3

EFFECT OF THE PH OF THE PAPER MAKING CONDITIONS

| EXAMPLE | pH | DESCRIPTION | WET TENSILE (lbs/in) | DRY TENSILE (lbs/in) |
|---|---|---|---|---|
| 13 | 7.5 | BLANK | 0.7 | 20.2 |
| 14 | 7.5 | 25 mg PVAA (MW 100k, 6% amine) | 5.3 | 27.4 |
| 15 | 7.5 | 25 mg PVAA/ 0.6 mg PER (10/0.25) | 5.4 | 28.8 |
| 16 | 7.5 | 25 mg PVAA/ 2.5 mg CAT/ 0.6 mg PER (10/1/0.25) | 7.3 | 36.7 |
| 17 | 5.5 | 25 mg PVAA/ 0.6 mg PER (10/0.25) | 4.9 | 29.1 |
| 18 | 5.5 | 25 mg PVAA/ 2.5 mg CAT/ 0.6 mg PER (10/1/0.25) | 7.0 | 34.5 |

Because the pH of an enzymatic reaction can have an effect on the reaction itself, Examples 13–18 are provided to demonstrate this effect. The results presented in Table 3 demonstrate that the reaction according to the present invention performs slightly better at pH 7.5 than at pH 5.5.

Examples 19–23
Effect of Phenol and Diamine Compounds on Paper Strength

The paper is made according to the procedure set forth in EXAMPLES 1–6 above, with the exception that different amounts and kinds of materials are added, according to the invention. The amounts and kinds of materials which are specifically used are disclosed in Table 4. The following new abbreviations are introduced for use in Table 4: ethylene diamine, MW approximately 600, ED-600; ethylene diamine, MW approximately 2000, ED-2001; phenol, PHE; hydrogen peroxide, $H_2O_2$.

TABLE 4

EFFECT OF PHENOL AND DIAMINE COMPOUNDS

| EX-AMPLE | DESCRIPTION | WET STRENGTH (lbs/in) | DRY STRENGTH (lbs/in) |
|---|---|---|---|
| 19 | BLANK | 1.7 | 51.0 |
| 20 | 51 mg PVAA/<br>2.8 mg CAT/<br>0.51 mg PER (10/0.56/0.1) | 11.5 | 61.5 |
| 21 | 51 mg PVAA/2.8 mg PHE/<br>0.7 mg PER/0.7 mg H$_2$O$_2$<br>(10/0.56/0.14/0.14) | 13.0 | 65.1 |
| 22 | 51 mg PVAA/15 mg ED-600/<br>5.5 mg CAT/1.4 mg PER<br>(10/3/1.07/0.27) | 11.6 | 60.0 |
| 23 | 51 mg PVAA/15 mg ED-2001/<br>5.5 mg CAT/1.4 mg PER<br>(10/3/1.07/0.27) | 11.9 | 57.9 |

These examples are presented to show that one can blend in diamine compounds into the formulation with success.

From the foregoing descriptions, one skilled in the art can easily ascertain the essential characteristics of this invention, and without departing from the spirit and scope thereof, can make various changes and modifications of the invention to adapt it to various usages and conditions.

What is claimed is:

1. A composition comprising (a) water-soluble polymeric material comprising at least one nucleophilic polymer, (b) phenolic compound, and (c) a component capable of converting the phenolic compound into a quinone compound.

2. A composition comprising (a) water-soluble polymeric material comprising at least one nucleophilic polymer, (b) phenolic compound, and (c) an oxidizing component.

3. The composition of claim 2, wherein the oxidizing component comprises a member selected from the group consisting of potassium dichromate, potassium permanganate, and mixtures thereof.

4. The composition of claim 2, wherein the oxidizing component comprises a metal catalyst and hydrogen peroxide.

5. The composition of claim 4, wherein the metal catalyst is selected from the group consisting of ferric chloride, cupric chloride, cobalt chloride, and mixtures thereof.

6. The composition of claim 2, wherein the oxidizing component comprises an enzyme system.

7. The composition of claim 6, wherein the at least one nucleophilic polymer comprises the following general structure:

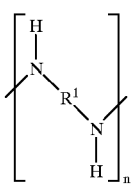

wherein n is an integer greater than 2, and R$^1$ comprises a hydrocarbyl group comprising from about 2 to about 20 carbons.

8. The composition of claim 7, wherein the hydrocarbyl group comprises an alkyl group.

9. The composition of claim 8, wherein the alkyl group comprises from about 6 to about 10 carbons.

10. The composition of claim 9, wherein the alkyl group comprises about 6 carbons.

11. The composition of claim 7, wherein n is from about 10 to about 200.

12. The composition of claim 11, wherein n is from about 50 to about 100.

13. The composition of claim 12, wherein n is from about 50 to about 80.

14. The composition of claim 9, wherein the at least one nucleophilic polymer comprises a member selected from the group consisting of polyalkyl amine, polycyclic alkyl amine, and mixtures thereof.

15. The composition of claim 6, wherein the at least one nucleophilic polymer comprises the following general structure:

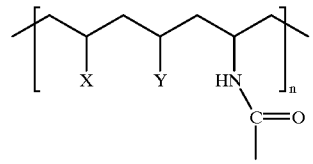

wherein n is an integer greater than 2, X comprises a nucleophile, and Y comprises a water solubility enabling group.

16. The composition of claim 15, wherein the nucleophile comprises a member selected from the group consisting of —NH$_2$, —NHR$^2$, —SH, —SOO$^-$, —ArO$^-$, and —PR$^2{}_2$, wherein R$^2$ comprises a hydrocarbyl group comprising from about 1 to about 12 carbons, and Ar comprises a benzenoid, a substituted benzenoid, or a napthalenoid group.

17. The composition of claim 16, wherein the hydrocarbyl group comprises a benzenoid group or an alkyl group.

18. The composition of claim 15, wherein the water solubility enabling group comprises a member selected from the group consisting of cationic, anionic, amphoteric, hydrogen bond participating groups, and mixtures thereof.

19. The composition of claim 15, wherein the water solubility enabling group comprises a member selected from the group consisting of —N$^+$(R$^3$)$_3$, —COO$^-$, —OSO$_3{}^-$, —OPO$_3{}^-$, —N$^+$(R$^3$)$_2$—R$^{3'}$—COO$^-$, —OH, —CONH$_2$, —B(OH)$_2$, and mixtures thereof, wherein R$^3$ and R$^{3'}$ comprise any moiety having from about 1 to about 12 carbons.

20. The composition of claim 6, wherein the at least one nucleophilic polymer comprises a member selected from the group consisting of polyvinyl alcohols, polyvinyl sulfones, polyacrylamides, polyacrylates, polyacrylonitriles, polyethers, polyesters, polyarylethers, polyarylsulfones, polyamides, polyimides, polyalkanes, polyaminoalkanes, polyphenyls, and mixtures thereof.

21. The composition of claim 6, wherein the at least one nucleophilic polymer is formed by a process comprising at least one addition reaction followed by reduction.

22. The composition of claim 6, wherein the at least one nucleophilic polymer comprises a member selected from the group consisting of —NH$_2$, —NHR$^4$, —SH, —SOO$^-$, —PR$^4{}_2$, —ArO$^-$, and mixtures thereof, wherein R$^4$ comprises a hydrocarbyl group comprising between about 1 and about 12 carbons, and Ar comprises a benzenoid or a napthalenoid group.

23. The composition of claim 22, wherein the hydrocarbyl group comprises a benzenoid group or an alkyl group.

24. The composition of claim 6, wherein the at least one nucleophilic polymer is formed by polymerizing a monomer comprising a nucleophile.

25. The composition of claim 6, wherein the at least one nucleophilic polymer comprises polyvinyl amine alcohol.

26. The composition of claim 25, wherein the polyvinyl amine alcohol comprises from about 0.01% to about 100% amine.

27. The composition of claim 26, wherein the polyvinyl amine alcohol comprises from about 10% to about 50% amine.

28. The composition of claim 27, wherein the polyvinyl amine alcohol comprises about 12% amine.

29. The composition of claim 6, wherein the phenolic compound comprises a polyphenolic compound.

30. The composition of claim 29, wherein the polyphenolic compound comprises a member selected from the group consisting of phloroglucinol, lignins, catechins, flavonoids, and mixtures thereof.

31. The composition of claim 29, wherein the polyphenolic compound comprises a member selected from the group consisting of polyphenols, resols, novolaks, calixerenes, and mixtures thereof.

32. The composition of claim 6, wherein the phenolic compound comprises the following general chemical structure:

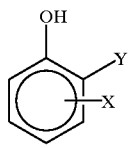

wherein Y comprises —H or —OH and X comprises —OR$^5$, —R$^5$, —Ar, or —NR$^5$R$^{5'}$, wherein R$^5$ and R$^{5'}$ comprise H or a hydrocarbyl group comprising from about 1 to about 12 carbons, and Ar comprises a benzenoid or napthalenoid group.

33. The composition of claim 32, wherein the hydrocarbyl group comprises an alkyl group.

34. The composition of claim 6, wherein the phenolic compound comprises a member selected from the group consisting of polyphenols, substituted polyphenols, phenols, substituted phenols, catechols, substituted catechols, hydroquinones, substituted hydroquinones, aminophenols, substituted aminophenols, and mixtures thereof.

35. The composition of claim 34, wherein the phenolic material comprises 1,2-benzenediol.

36. The composition of claim 34, wherein the phenolic material comprises 1,4-benzenediol.

37. The composition of claim 6, wherein the enzyme system comprises at least one oxidation enzyme.

38. The composition of claim 37, wherein the at least one oxidation enzyme comprises an oxidase.

39. The composition of claim 37, wherein the at least one oxidation enzyme comprises a peroxidase.

40. The composition of claim 39, wherein the peroxidase comprises a member selected from the group consisting of horseradish peroxidases, soybean peroxidases, haloperoxidases, lactoperoxidases, bacterial peroxidases, and mixtures thereof.

41. The composition of claim 38, wherein the oxidase comprises a member selected from the group consisting of laccase, tyrosinase, polyphenol oxidase, and mixtures thereof.

42. The composition of claim 39, wherein the peroxidase comprises horseradish peroxidase.

43. The composition of claim 6, wherein the enzyme system comprises at least one oxygen source.

44. The composition of claim 43, wherein the oxygen source comprises a member selected from the group consisting of perborates, persulfates, peroxides, and mixtures thereof.

45. The composition of claim 6, wherein the enzyme system comprises an alcohol oxidase and its corresponding alcohol.

46. The composition of claim 45, wherein the enzyme system comprises ethanol and ethanol oxidase.

47. The composition of claim 6, wherein the enzyme system comprises a sugar oxidase and its corresponding sugar.

48. The composition of claim 47, wherein the enzyme system comprises glucose and glucose oxidase or galactose and galactose oxidase.

49. The composition of claim 6, in combination with a cellulosic material.

50. The composition of claim 49, wherein the cellulosic material comprises paper pulp.

51. A resin for imparting strength to a paper product, produced by combining (a) water-soluble polymeric material comprising at least one nucleophilic polymer, (b) phenolic compound, and (c) an oxidizing component.

52. The resin of claim 51, wherein the oxidizing component comprises an enzyme system.

53. The resin of claim 51, in combination with cellulosic material.

54. The resin of claim 51, wherein the cellulosic material comprises a member selected from the group consisting of fiber mat, woven cloth, box, board, sheet, wood, particle board, wood stranded board, and laminate.

55. A creping adhesive, produced by combining (a) water-soluble polymeric material comprising at least one nucleophilic polymer, (b) phenolic compound, and (c) an oxidizing component.

56. The creping adhesive of claim 55, wherein the oxidizing component comprises an enzyme system.

57. The creping adhesive of claim 55, in combination with cellulosic material.

58. The creping adhesive of claim 57, wherein the cellulosic material comprises a member selected from the group consisting of fiber mat, woven cloth, box, board, sheet, wood, particle board, wood stranded board, and laminate.

59. A method of increasing the strength of a paper product, comprising adding (a) water-soluble polymeric material comprising at least one nucleophilic polymer, (b) phenolic compound, and (c) an oxidizing component, to paper pulp.

60. The method of claim 59, wherein the oxidizing component comprises an enzyme system.

61. A method of imparting strength to a cellulose-based product comprising adding (a) water-soluble polymeric material comprising at least one nucleophilic polymer, (b) phenolic compound, and (c) an oxidizing component, to cellulosic starting materials.

62. The method of claim 61, wherein the oxidizing component comprises an enzyme system.

63. A resin for imparting strength to a paper product comprising the composition of claim 2.

64. The resin of claim 63, wherein the oxidizing component comprises an enzyme system.

65. A creping adhesive comprising the composition of claim 2.

66. The creping adhesive of claim 65, wherein the oxidizing component comprises an enzyme system.

67. A kit comprising water-soluble polymeric material comprising (a) at least one nucleophilic polymer, (b) phenolic compound, and (c) a component capable of converting the phenolic compound into a quinone compound.

68. A composition comprising a polyvinyl alkylamine, a benzenediol, and horseradish peroxidase.

* * * * *